US008724331B2

(12) United States Patent
Chu

(10) Patent No.: US 8,724,331 B2
(45) Date of Patent: May 13, 2014

(54) INTELLIGENT WALL-MOUNTED SWITCH MODULE

(76) Inventor: Ching-Hsiung Chu, New Taipei (TW)

( * ) Notice: Subject to any disclaimer, the term of this patent is extended or adjusted under 35 U.S.C. 154(b) by 81 days.

(21) Appl. No.: 13/466,140

(22) Filed: May 8, 2012

(65) Prior Publication Data
US 2013/0301224 A1 Nov. 14, 2013

(51) Int. Cl.
H05K 7/02 (2006.01)
(52) U.S. Cl.
USPC .......................................... 361/728; 361/730
(58) Field of Classification Search
USPC ............... 361/730, 796, 679.01, 728, 679.02, 361/627; 700/300, 301, 302; 200/5 R, 296
See application file for complete search history.

(56) References Cited

U.S. PATENT DOCUMENTS

2008/0151458 A1* 6/2008 Beland et al. ................. 361/114
2010/0182262 A1* 7/2010 Yoshikawa et al. ........... 345/173
2011/0267277 A1* 11/2011 Balch et al. ................... 345/169
2012/0068832 A1* 3/2012 Feldstein et al. ............. 340/12.5
2012/0299728 A1* 11/2012 Kirkpatrick et al. .......... 340/541

* cited by examiner

Primary Examiner — Robert J Hoffberg
Assistant Examiner — Michael Matey

(57) ABSTRACT

An intelligent wall-mounted switch module is provided so that plural electric appliances can be turned on or off mechanically with a single switching element through touch-based selection. The switch module includes a switching element mounted on a wall. The switching element has a control unit electrically connected to the electric appliances and a display for displaying, under control of the control unit, plural identification images whereby the electric appliances or the space or spaces where they are located can be identified. A touch panel is provided on a surface of the display. A user may slide a finger along the touch panel, thus instructing the control unit to switch the identification images displayed by the display. Then, the switching element can be switched so as for the control unit to turn on or off the electric appliance corresponding to the identification image displayed. The switch module features enhanced durability.

9 Claims, 9 Drawing Sheets (A-A)

INTELLIGENT WALL-MOUNTED SWITCH MODULE

BACKGROUND OF THE INVENTION

1. Technical Field

The present invention provides an intelligent wall-mounted switch module and, in particular, a switch module which allows a plurality of electric appliances to be turned on or off by a single mechanical switching element through touch-based selection and in a mechanical manner. More particularly, the present invention relates to the control unit, the display, and the touch panel of such a switch module.

2. Description of Related Art

A common wall-mounted switch is embedded on an indoor or outdoor wall and configured for controlling the power supplied to an indoor or outdoor electric lamp. Generally, a wall-mounted switch is provided with a number of basic sockets and basic keys.

The basic keys can be mechanically driven to turn on or off electric lamps. The basic sockets, on the other hand, are provided for connecting with the plugs of domestic electric appliances such as an electric fan, a television set, a radio, and a computer, so that electricity can be delivered to the electric appliances through the basic sockets and the plugs.

Typically, each basic key of a traditional wall-mounted switch is electrically connected to a single electric lamp or like electric appliance by a power cable. Hence, a plurality of basic keys are required to turn on or off a plurality of electric appliances respectively. Moreover, the wall on which a traditional wall-mounted switch is provided is, in most cases, in the same space as the electric appliances to be controlled by the wall-mounted switch. Therefore, a user who has switched the wall-mounted switch can immediately know whether the intended electric appliance or appliances is or are turned on or off.

However, the configurations of the foregoing traditional wall-mounted switches do not allow a user to control a plurality of electric appliances with a single basic key, or switching element, be the electric appliances located in the same space or different spaces. The user must go to the specific space or each of the different spaces and turn on or off the plural electric appliances one after another, which is rather inconvenient.

Nowadays, touch panels are extensively used as the power control interface of various electric appliances in our daily lives. A user may select a function of an electric appliance, confirm the selection, and activate the function by sliding a finger along a touch panel or pressing at the touch panel.

Nevertheless, the aforesaid touch panels for use in the power supply control of electric appliances tend to become less sensitive or may even break should they be improperly pressed for many times. Obviously, several technical problems must be overcome before touch panels can be used as wall-mounted switches for making selections from and turning on or off a plurality of electric appliances. This has been an issue that the industry is eager to address.

BRIEF SUMMARY OF THE INVENTION

The primary object of the present invention is to provide an intelligent wall-mounted switch module capable of overcoming the drawbacks of the prior art. It is desirable that this wall-mounted switch module can remedy the inconvenience of use of the traditional wall-mounted switches, whose configurations make it impossible for a single switching element to control a plurality of electric appliances located in the same space or different spaces. It is also desirable that this wall-mounted switch module can solve the problem that touch panels, once used as wall-mounted switches and improperly pressed, are subject to reduced sensitivity or breakage; thus, the switch module can incorporate a touch panel but still have high durability and a long service life.

To achieve the above object, the intelligent wall-mounted switch module of the present invention includes a switching element, a control unit, a plurality of electric appliances, a display, and a touch panel.

The switching element is provided on a wall.

The control unit is provided in the switching element and is electrically connected thereto.

The plural electric appliances are respectively and electrically connected to the control unit.

The display is provided on the switching element and is electrically connected to the control unit. The display can display a plurality of identification images under control of the control unit, so that the electric appliances or the space or spaces where the electric appliances are located can be identified by the identification images.

The touch panel is provided on a surface of the display and is electrically connected to the control unit. A user may slide a finger along the touch panel, thus instructing the control unit to switch the content displayed by the display to any of the identification images. Then, the mechanical switching element can be switched, so as for the control unit to turn on or off the electric appliance corresponding to the identification image displayed by the display. Thus, the electric appliances can be turned on or off with the single switching element through touch-based selection and in a mechanical manner.

According to the above, the display can display any of the plural identification images, allowing the user to identify the electrical appliance that the switching element currently can control. In addition, the user may slide a finger along the touch panel in an axial direction, thereby sequentially switching the identification images displayed by the display. Once the identification image corresponding to the electric appliance to be controlled is displayed by the display, the switching element can be switched to turn on or off the power of the electric appliance represented by the identification image.

As the single switching element allows the identification image of any of the electric appliances to be selected by touch control and can mechanically turn on or off the electric appliance corresponding to each identification image displayed, both convenience of use and durability of the intelligent wall-mounted switch module are enhanced.

Besides, the present invention includes the following features:

In addition to the foregoing major structural features, the switching element includes a seat provided in the wall, a housing provided on the seat and exposed from the wall, a key pivotally provided on the seat and exposed from the housing, and a power on/off unit provided in the housing and configured to be driven by the key. The housing may be the housing of a traditional wall-mounted switching element. The control unit is electrically connected to the power on/off unit. The key has a window in which the display is embedded, thus allowing the identification images to be shown on the key to enable rapid identification of the electric appliances that the switching element can turn on or off.

In addition to the foregoing major structural features, a plurality of light-emitting elements are provided inward of the periphery of the housing, and the housing is provided with at least one button for turning on or off the light-emitting elements. The light-emitting elements can be driven to emit light by the at least one button, as a way to indicate the location of the switching element. Further, each button is provided therein with a light-emitting element for indicating the location of the button. The light-emitting elements also serve to illuminate the surroundings.

In addition to the foregoing major structural features, the electric appliances may be located in the same space as the switching element or in a space or spaces different from where the switching element is located. Thus, the single switching element can turn on or off the electric appliances located in the same space as the switching element or in a space or spaces different from where the switching element is located.

In addition to the foregoing major structural features, the electric appliances maybe domestic electric appliances, alarms, or anti-burglary devices.

In addition to the foregoing major structural features, the intelligent wall-mounted switch module further includes a memory unit provided in the switching element and electrically connected to the control unit. The memory unit stores the identification images, which are still images and are supplied to the display via the control unit so as to be displayed.

In addition to the foregoing major structural features, the intelligent wall-mounted switch module further includes at least one camera electrically connected to the control unit. The at least one camera is provided where the electric appliances are located and is configured for capturing the identification images in real time. The identification images thus captured are supplied to the display via the control unit so as to be displayed.

In addition to the foregoing major structural features, the intelligent wall-mounted switch module further includes a sensor electrically connected to the control unit. The sensor may be located in the same space as the electronic appliances or in a space different from where the electric appliances are located.

When the sensor sends out a trigger signal, the control unit instructs the display to display one of the identification images. The sensor may be an infrared sensor or a doorbell switch.

In addition to the foregoing major structural features, the control unit may be electrically connected to a temperature detector or a humidity detector, and the display may display the current time, the temperature detected by the temperature detector, the humidity detected by the humidity detector, and so on, under control of the control unit. By sliding a finger along the touch panel, a user can switch between the identification images, the current time, the temperature, and the humidity.

The present invention has the following advantages over the prior art:

1. As the single switching element can control the electric appliances corresponding respectively to the plural identification images displayed by the display, multiple power control is achieved.

2. Now that the identification image corresponding to an intended electric appliance can be selected via the display, and the intended electric appliance can be turned on or off mechanically by the switching element, the touch panel used in the switch module is saved from being improperly pressed, which, as is known from the prior art, may cause a reduction in sensitivity or even breakage of the touch panel. Therefore, the durability and service life of the switch module will not be compromised by malfunction or failure of the touch panel.

3. As the housing of the switching element may be the housing of a traditional wall-mounted switch, an existing traditional wall-mounted switch can be directly replaced by and upgraded to the intelligent wall-mounted switch module.

4. Once the switching element is switched, whether the intended electric appliance is turned on or off can be monitored in real time via the display. This allows the user to know the operating conditions of the plural electric appliances—a feature especially useful if the electric appliances are located in different spaces.

5. The light-emitting elements can indicate the locations of the switch module and of the at least one button while doubling as a small night lamp.

6. The display of the switch module can display the current time, temperature, and humidity for easy reference by the user.

7. The identification images, time, temperature, and humidity displayed can be switched by sliding a finger along the touch panel. Such a switching operation is both convenient and user-friendly.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
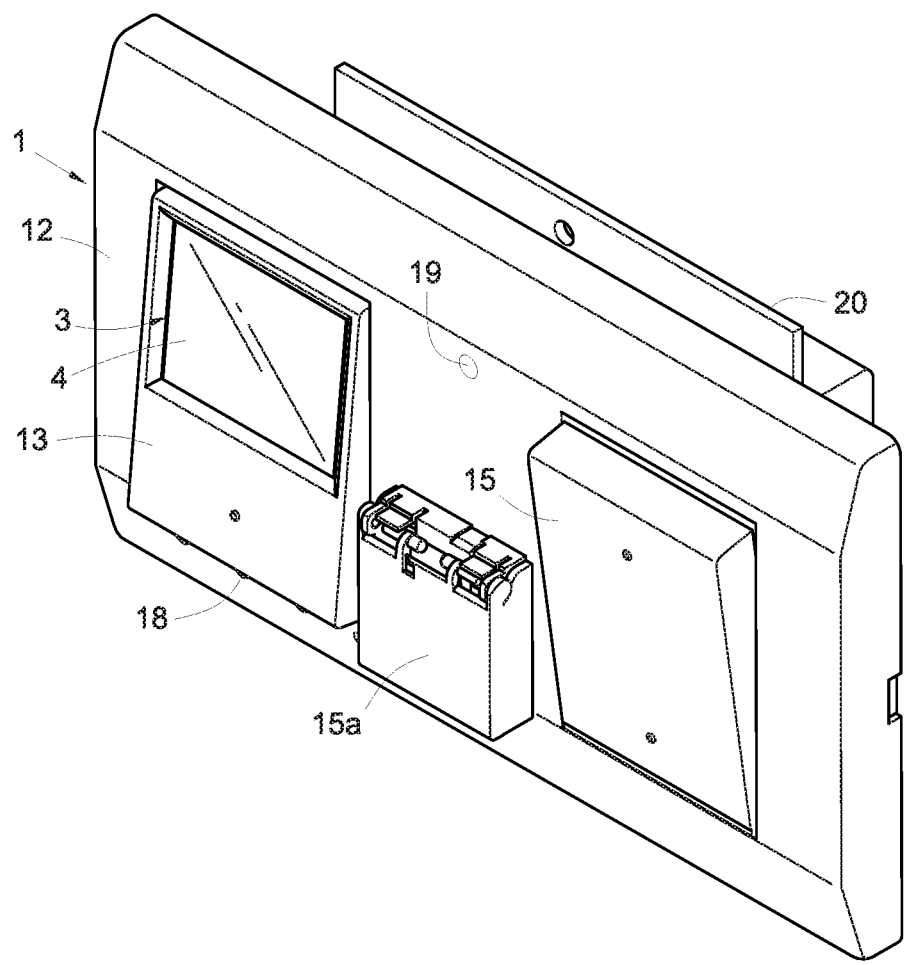
FIG. 1 is a perspective view of a preferred embodiment of the present invention.
Figure 2:
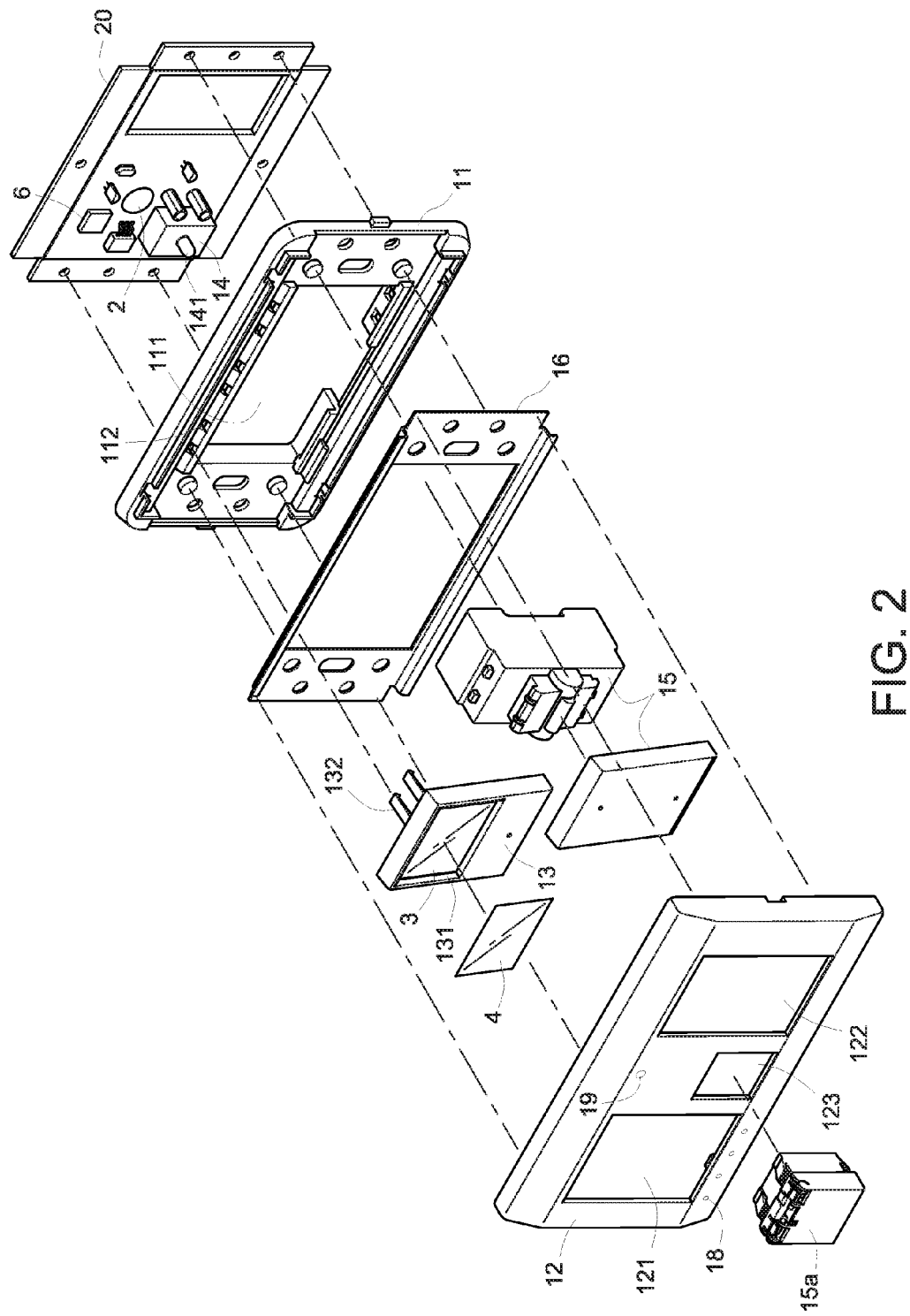
FIG. 2 is an exploded perspective view of the embodiment depicted in FIG. 1.

The intelligent wall-mounted switch module of the present invention is now described with reference to FIG. 1 in conjunction with FIG. 2 to FIG. 5, wherein FIG. 1 shows a preferred embodiment of the present invention in a perspective view. The switch module includes a switching element 1; a control unit 2; a plurality of electric appliances 9, 9a; a display 3; and a touch panel 4.

The switching element 1 is provided on an indoor or outdoor wall. The switching element 1 includes a seat 11 provided in a junction box on the wall, a housing 12 provided on the seat 11 and exposed from the wall, a key 13 pivotally provided on the seat 11 and exposed from a surface of the housing 12, and a power on/off unit 14 provided in the housing 12 and configured to be driven by the key 13. The housing 12 may be the housing of a traditional wall-mounted switch.

The seat 11 is formed with a receiving cavity 111 which is open on both sides, i.e., open to the front and to the back. The power on/off unit 14 is located in the receiving cavity 111. The housing 12 is formed with a plurality of openings 121, 122, 123 which communicate with the receiving cavity 111. The key 13 is formed with a window 131 which communicates with the receiving cavity 111. The top of the key 13 is formed with a plurality of hooks 132 which extend toward the seat 11. The top of the receiving cavity 111 is formed with a plurality of fastening grooves 112 to which the hooks 132 are respectively and pivotally connectable.

The control unit 2 is provided in the switching element 1. In fact, the control unit 2 may be provided on a circuit board 20 which is configured for controlling power on/off and which is provided on one side of the seat 11 such that the seat 11 is located between the housing 12 and the circuit board 20. Further, the control unit 2 is located in the receiving cavity 111. The control unit 2 may be electrically connected to the power on/off unit 14 of the switching element 1 via the circuit board 20.

The electric appliances 9, 9a maybe located in an indoor or outdoor space away from the switching element 1. Moreover, the electric appliances 9, 9a are each electrically connected to the circuit board 20 and the control unit 2. The electric appliances 9, 9a may be electric lamps, electric fans, television sets, radios, computers, and like domestic electric appliances. The electric appliances 9, 9a may also be the loudspeakers of an alarm or the electronic locks of an anti-burglary device. Beside, the electric appliances 9, 9a may be located in the same space as the switching element 1 or in a space or spaces different from where the switching element 1 is located.

The space or spaces where the electric appliances 9, 9a are located refer to the indoor or outdoor space or spaces in which the electric appliances 9, 9a are installed or disposed. The space where the switching element 1 is located refers to the indoor or outdoor space in which the switching element 1 is installed. The aforesaid indoor or outdoor spaces include vestibules, kitchens, living rooms, bedrooms, bathrooms, yards, balconies, and so forth.

Figure 9:
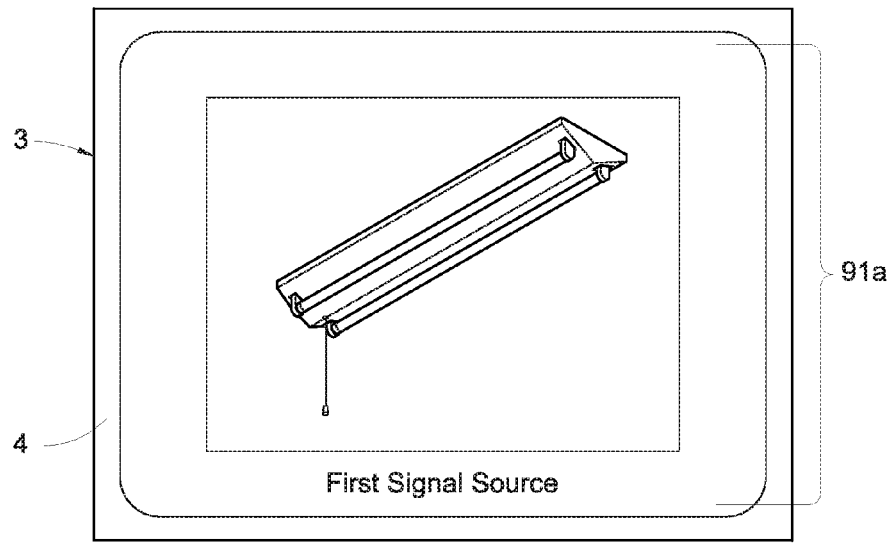
FIG. 9 shows another state of use of the display depicted in FIG. 4.

The display 3, which may be a liquid crystal display (LCD), is embedded in the window 131 of the key 13 of the switching element 1 and is exposed from a surface of the key 13. In addition, the display 3 is electrically connected to the circuit board 20 and the control unit 2. Under control of the control unit 2, the display 3 can display a plurality of identification images 91, 91a, 91b (see FIG. 7, FIG. 9, and FIG. 11) by which the electric appliances 9, 9a or the space or spaces where the electric appliances 9, 9a are located can be identified.

The identification images 91, 91a, 91b may be texts, two-dimensional (2D) graphics, three-dimensional (3D) graphics, still 3D images, pre-recorded moving 3D images, or real-time moving 3D images that can help a user identify the electric appliances 9, 9a or the space or spaces where the electric appliances 9, 9a are located. In other words, the identification images 91, 91a, 91b represent the electric appliances 9, 9a or the space or spaces where the electric appliances 9, 9a are located.

The touch panel 4 is provided on a surface of the display 3 and is electrically connected to the circuit board 20 and the control unit 2. When a user slides a finger along the surface of the touch panel 4 in a certain axial direction, the control unit 2 can be driven to switch the content displayed by the display 3 to any of the identification images 91, 92 (see FIG. 7 and FIG. 8).

Figure 6:
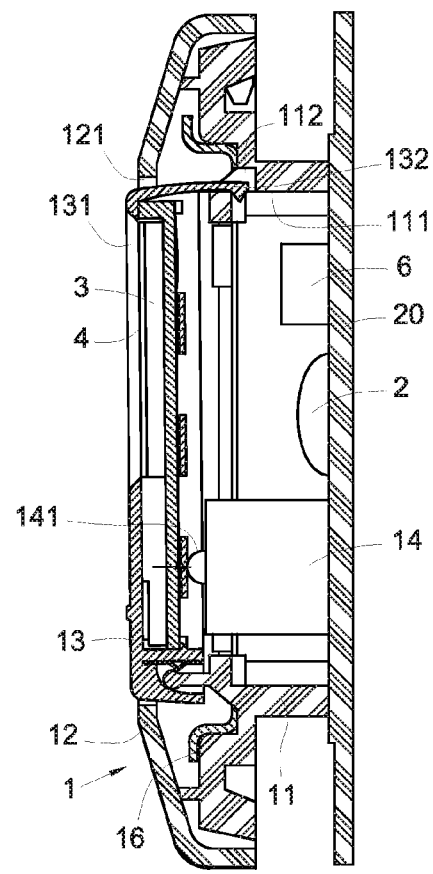
FIG. 6 is a sectional view similar to FIG. 5, showing a state of use.

The switching element 1 can control the electric appliance 9, 9a represented by the identification image 91, 92 currently displayed by the display 3. More specifically, the electric appliance 9, 9a represented by each of the identification images 91, 92 displayed by the display 3 can be turned on or off by the control unit 2 by the user switching the mechanical switching element 1 (see FIG. 6). Thus, the single switching element 1 is capable of turning on or off the electric appliances 9, 9a through touch-based selection and in a mechanical manner.

The switching element 1 is also provided therein with at least one basic key 15, 15a. The basic keys 15, 15a may be the traditional power on/off keys for turning on or off indoor or outdoor electric lamps. The basic keys 15, 15a may be provided in the receiving cavity 111, embedded in the openings 122, 123 respectively, and exposed from a surface of the housing 12. In addition, a fixing frame 16 is provided between the seat 11 and the housing 12 to position the housing 12 securely.

Figure 3:
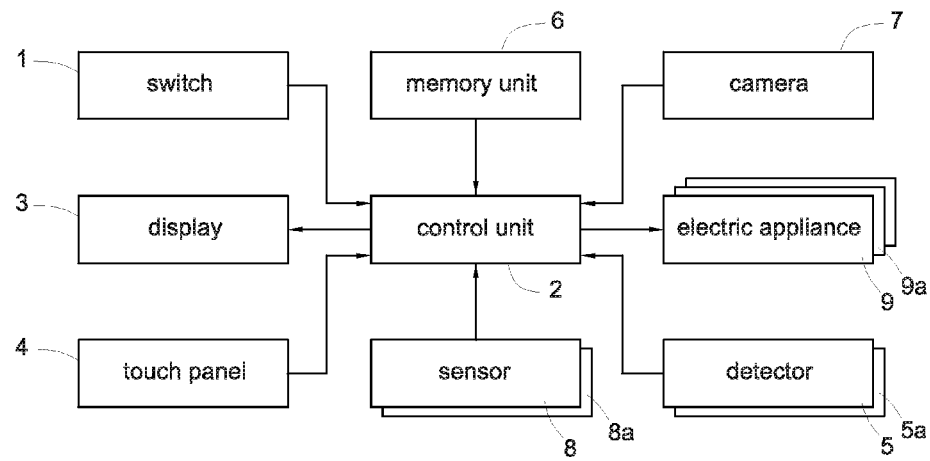
FIG. 3 is a block diagram showing the arrangement of the embodiment depicted in FIG. 1.
Figure 4:
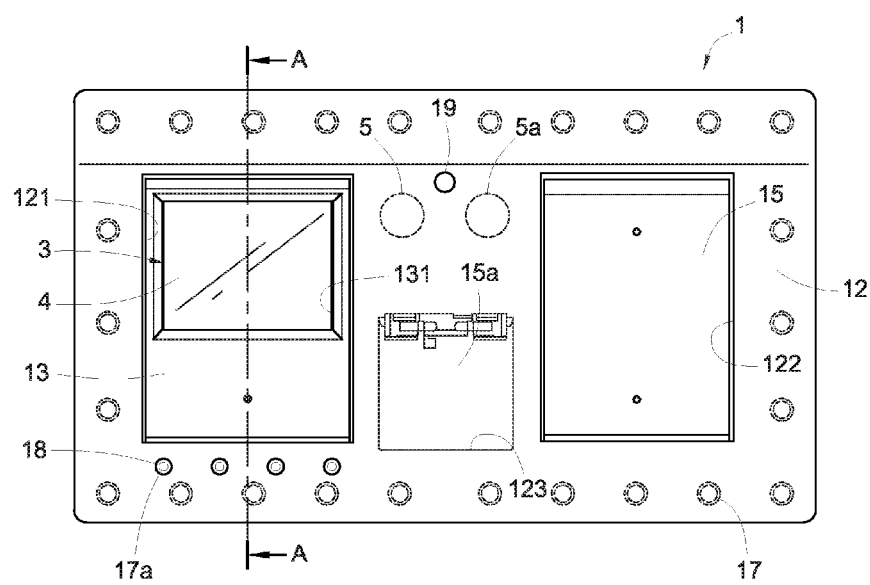
FIG. 4 is a front view of the embodiment depicted in FIG. 1.
Figure 5:
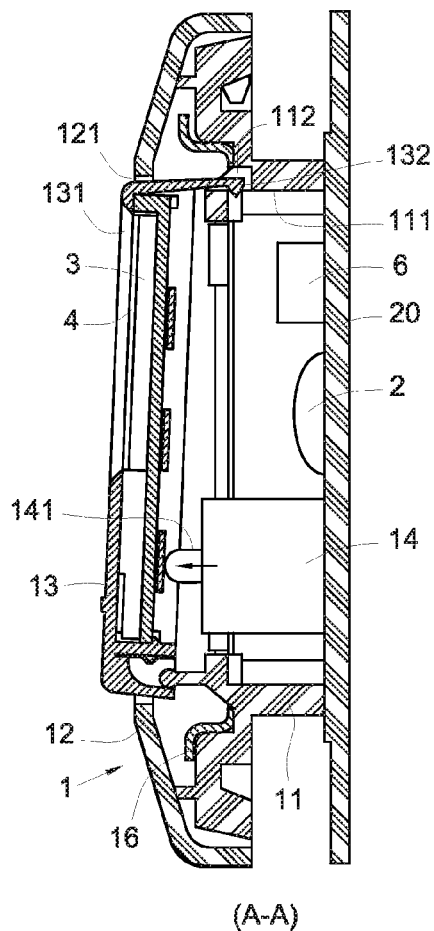
FIG. 5 is the A-A sectional view of FIG. 4.

The control unit 2 and the circuit board 20 may also be electrically connected to a temperature detector 5 or a humidity detector 5a (as shown in FIG. 3 and FIG. 4). Under control of the control unit 2, the display 3 can display such real-time information as the current time, the temperature detected by the temperature detector 5, and the humidity detected by the humidity detector 5a (see FIG. 13). By sliding a finger along the touch panel 4 in a certain axial direction, a user can instruct the control unit 2 to switch the identification images 91, 92; the time; the temperature; and the humidity displayed.

A plurality of light-emitting elements 17 are provided inward of the periphery of the housing 12, and at least one button 18 for turning on or off the light-emitting elements 17 is provided at the bottom end of the housing 12. The buttons 18 can drive the light-emitting elements 17 to emit light as an indication of the location of the switching element 1. Each button 18 is also provided therein with a light-emitting element 17a to indicate the location of each button 18. The light-emitting elements 17 also serve to light up the surroundings.

The light-emitting elements 17, 17a may be light-emitting diodes. The light-emitting elements 17, 17a and the buttons 18 may be electrically connected to the control unit 2.

The buttons 18 can be used to control the control unit 2 such that the light-emitting elements 17 are driven to emit light by the control unit 2.

In this embodiment, there are four buttons 18, which are respectively configured for turning on or off the light-emitting elements 17, gradually increasing the light emission brightness of the light-emitting elements 17, gradually decreasing the light emission brightness of the light-emitting elements 17, and automatically adjusting the light emission brightness of the light-emitting elements 17. Moreover, the housing 12 is provided with a photosensor 19 electrically connected to the control unit 2. The control unit 2 can automatically adjust the light emission brightness of the light-emitting elements 17 based on the ambient brightness sensed by the photosensor 19.

Figure 7:
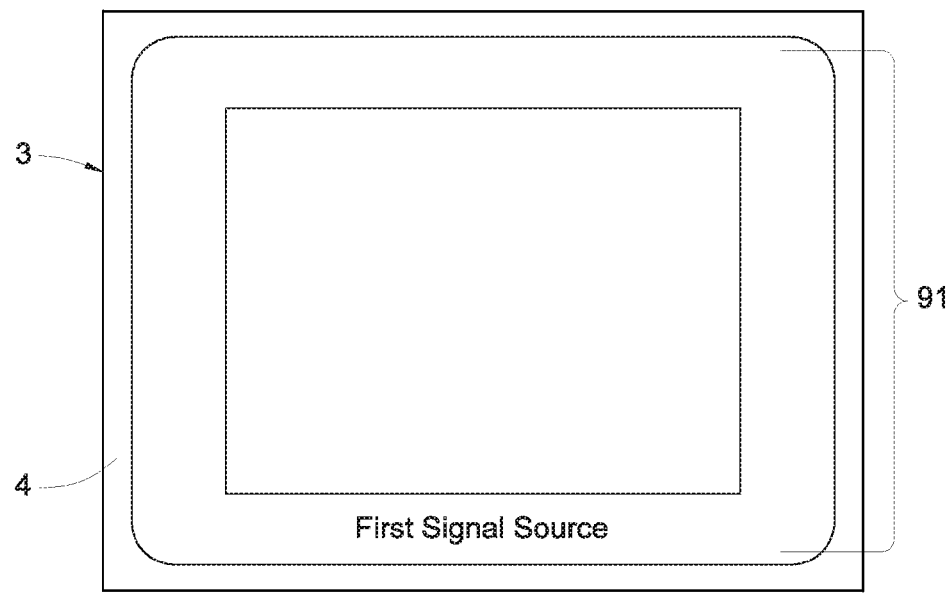
FIG. 7 shows a state of use of the display depicted in FIG. 4.
Figure 8:
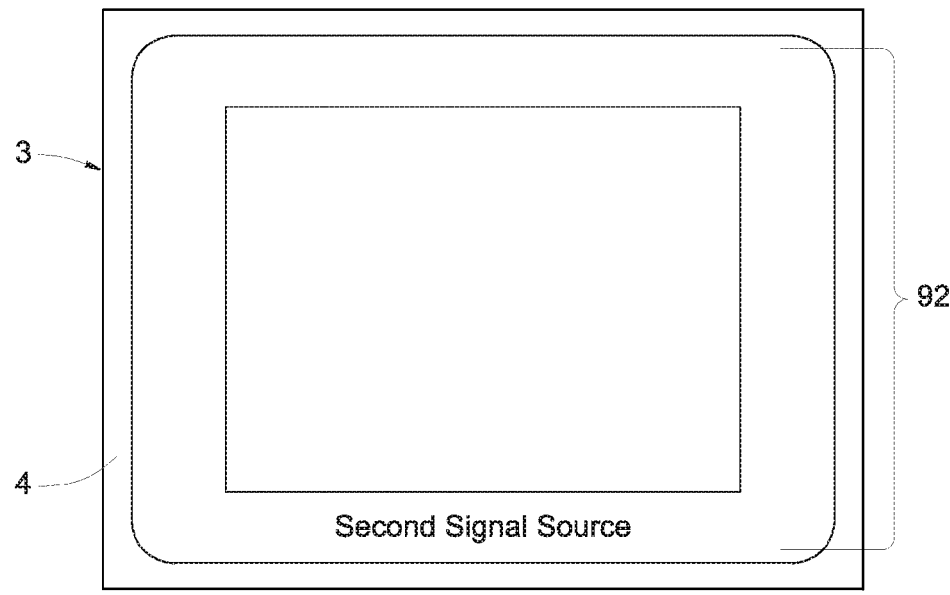
FIG. 8 shows the state of use following that of FIG. 7.

According to the structure described above, the display 3 can display any of the identification images 91, 92 such that each identification image 91, 92 can be directly shown on the surface of the key 13, allowing the user to rapidly identify the electric appliance 9, 9a that the switching element 1 can control at the moment. Referring to FIG. 7 and FIG. 8, the identification images 91, 92 are the texts "First Signal Source" and "Second Signal Source" respectively. The identification image 91 may represent the electric appliance 9, and the identification image 92 may represent the electric appliance 9a.

By sliding a finger upward or downward along the surface of the touch panel 4, a user can instruct the display 3 to display either the identification image 91 or the identification image 92. Once the content displayed by the display 3 is switched to the identification image 91, which corresponds to the electric appliance 9 that the user intends to control, the user can press the key 13 of the switching element 1 such that the key 13 drives a resilient rod 141 of the power on/off unit 14 that is depressible into the power on/off unit 14. As a result, the power on/off unit 14 drives the control unit 2 to turn on or off the power of the electric appliance 9 represented by the identification image 91.

The user may also slide a finger upward or downward along the surface of the touch panel 4 to switch the content displayed by the display 3 to the identification image 92 corresponding to the electric appliance 9a. Then, by pressing the switching element 1, the control unit 2 will be driven to turn on or off the power of the electric appliance 9a represented by the identification image 92.

Figure 13:
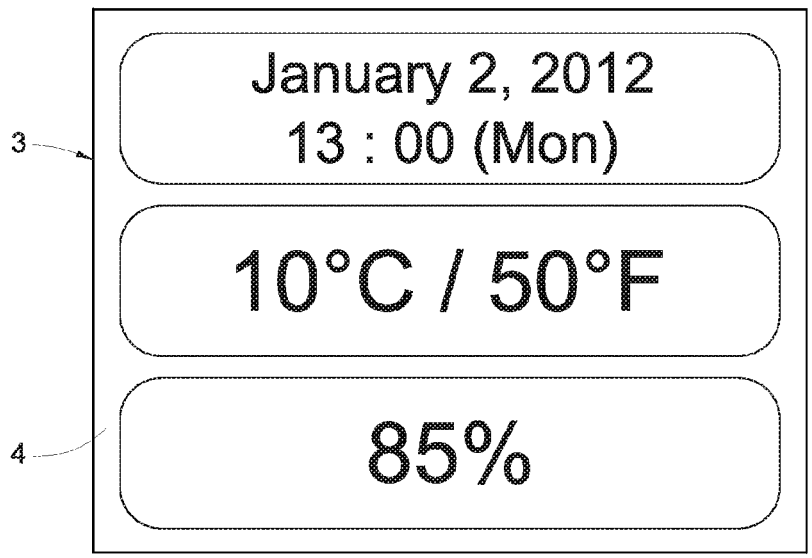
FIG. 13 shows still another state of use of the display depicted in FIG. 4.
Figure 14:
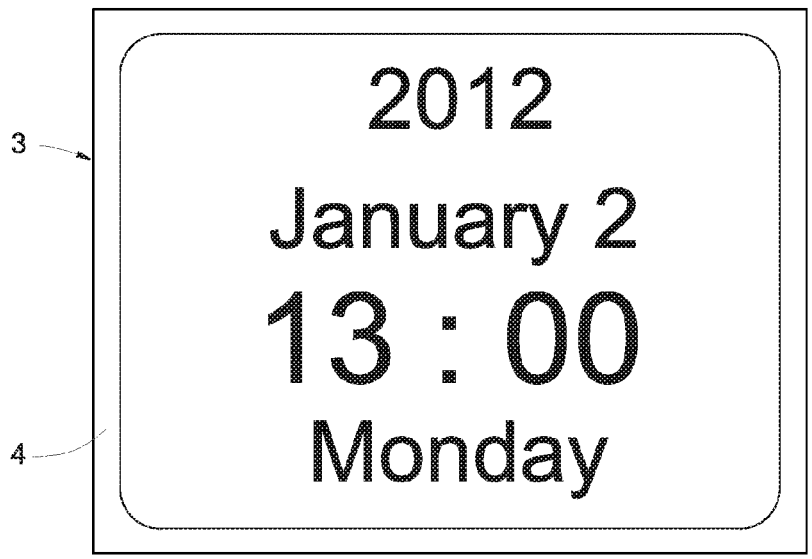
FIG. 14 shows the state of use following that of FIG. 13.
Figure 15:
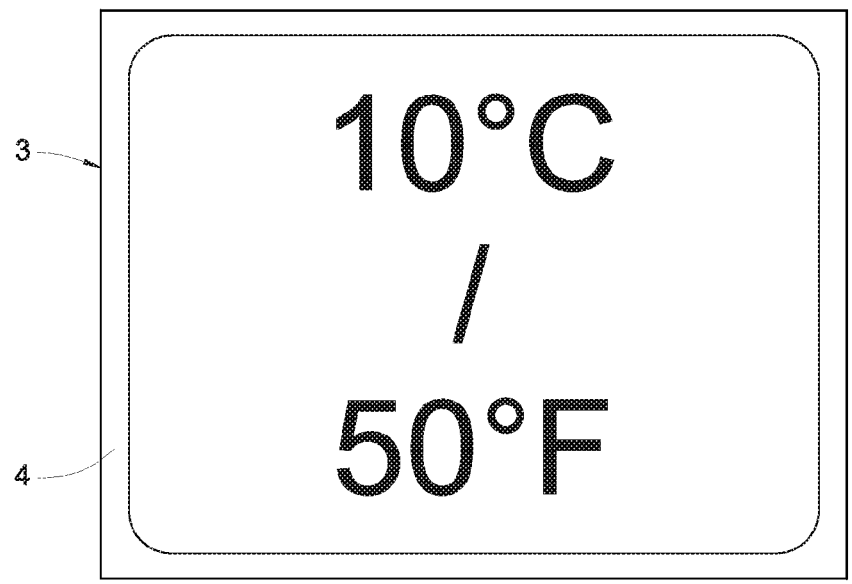
FIG. 15 shows the state of use following that of FIG. 14.
Figure 16:
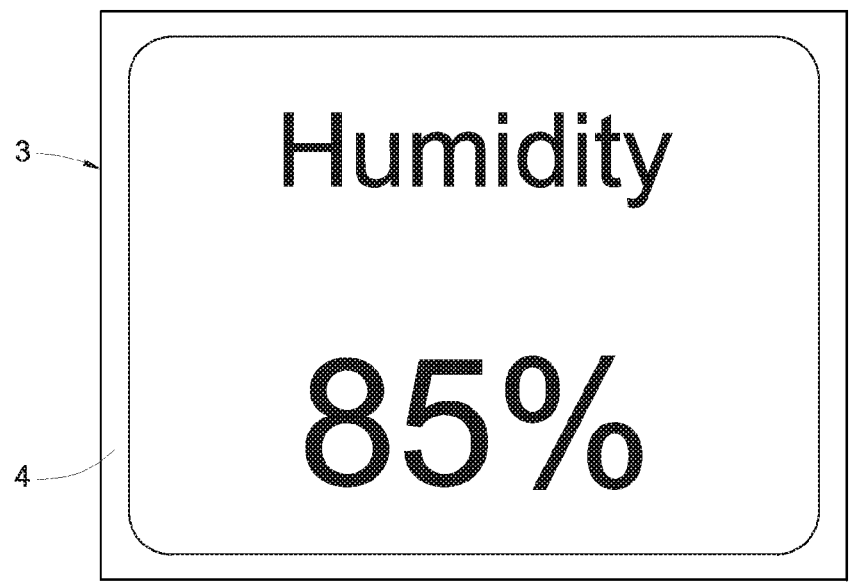
FIG. 16 shows the state of use following that of FIG. 15.

The user may also slide a finger leftward or rightward along the surface the touch panel 4 to switch the content displayed by the display 3 to the current time, temperature, and humidity (see FIG. 13). Afterward, the user may slide a finger upward or downward along the surface of the touch panel 4 to switch the content displayed by the display 3 to each of the current time, temperature, and humidity sequentially (see FIG. 14 to FIG. 16).

Thus, the single switching element 1 not only allows the identification images 91, 92 corresponding to the electric appliances 9, 9a to be selected by touch control, but also can mechanically turn on or off the electric appliances 9, 9a respectively represented by the identification images 91, 92. In consequence, the aforementioned drawbacks of the prior art are overcome, which are: 1) the inconvenience of use of the traditional wall-mounted switches, whose configurations do not allow a single switching element to control a plurality of electric appliances located in the same space or in different spaces; and 2) the potential reduction in sensitivity or breakage of touch panels when used as wall-mounted switches and subjected to an improper pressing action.

Figure 10:
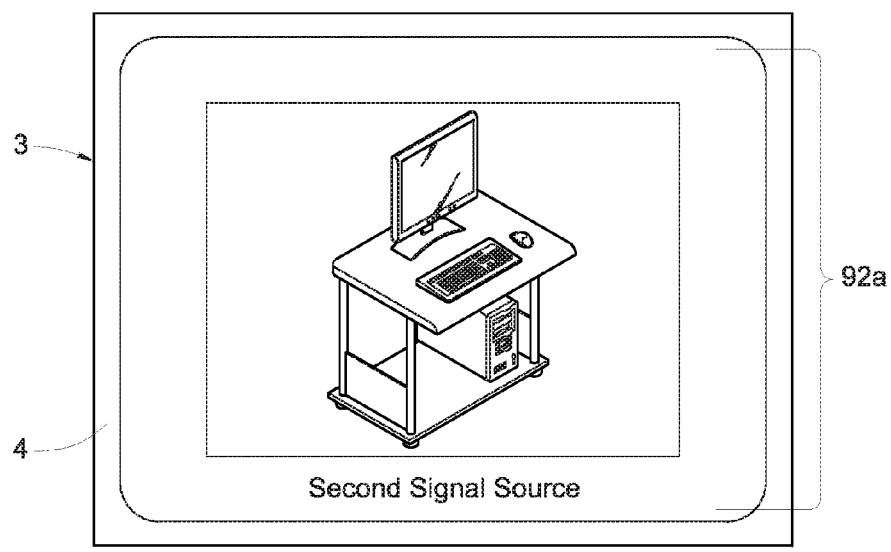
FIG. 10 shows the state of use following that of FIG. 9.

In another embodiment, the present invention further includes a memory unit 6 (see FIG. 2, FIG. 3, and FIG. 5) provided in the receiving cavity 111 of the switching element 1 and electrically connected to the control unit 2. The memory unit 6 stores the identification images 91a, 92a, which are still images (see FIG. 9 and FIG. 10). Each of the identification images 91a, 92a includes a text and a still 3D image (also known as photograph). The electric lamp in the identification image 91a may represent the electric appliance 9, and the computer in the identification image 92a may represent the electric appliance 9a. The identification images 91a, 92a are supplied to the display 3 via the control unit 2 so as to be displayed. The rest of the components in this embodiment are the same as those in the previous embodiment.

Figure 11:
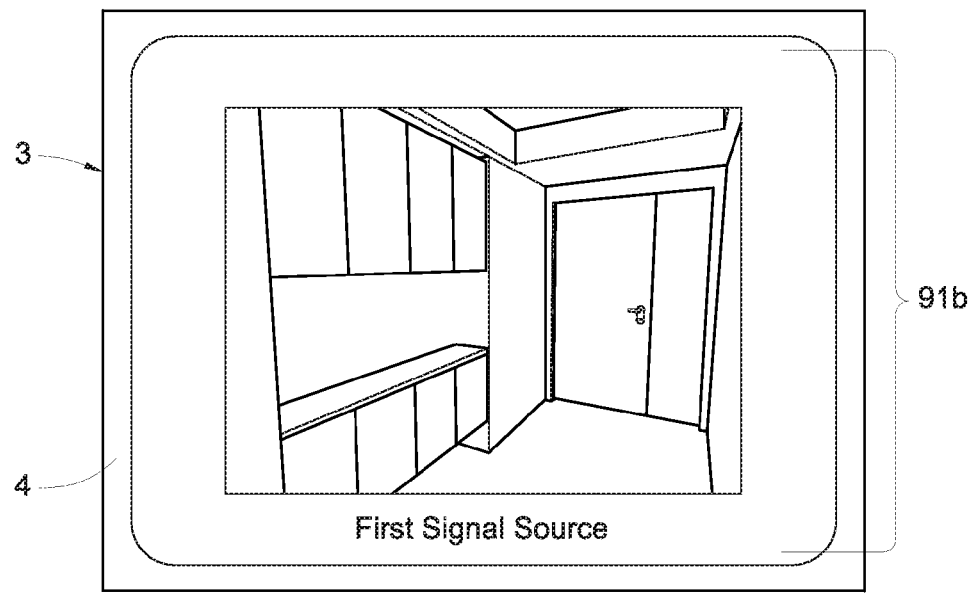
FIG. 11 shows yet another state of use of the display depicted in FIG. 4.
Figure 12:
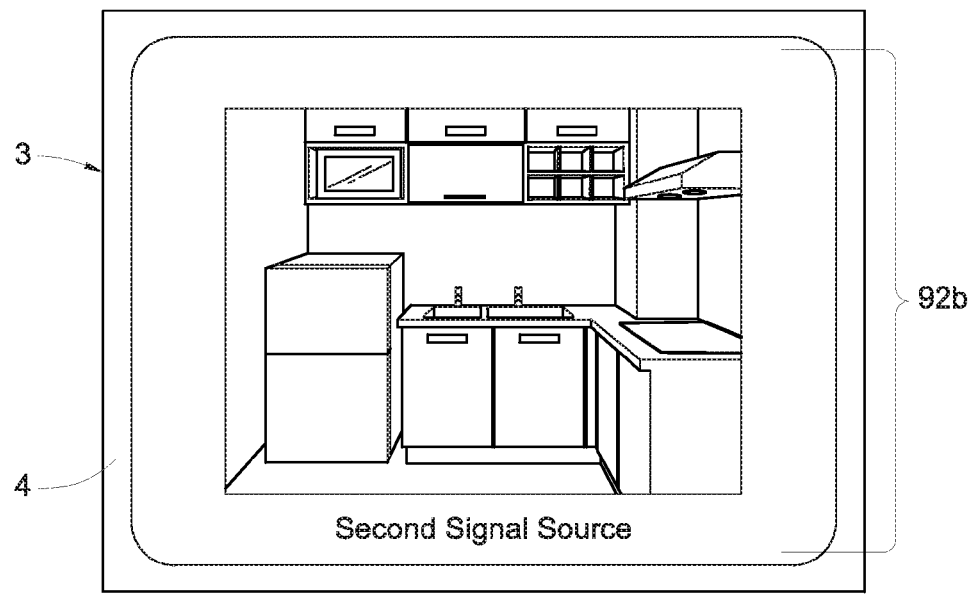
FIG. 12 shows the state of use following that of FIG. 11.

In yet another embodiment, the present invention further includes at least one camera 7 (see FIG. 3) electrically connected to the control unit 2. The at least one camera 7, provided in the space or spaces where the electric appliances 9, 9a are located, is configured to capture the identification images 91b, 92b in real time (as shown in FIG. 11 and FIG. 12). Each of the identification images 91b, 92b includes a text and a moving 3D image captured in real time by the at least one camera 7. The vestibule in the identification image 91b may represent the space where the electric appliance 9 is located, and the kitchen in the identification image 92b may represent the space where the electric appliance 9a is located. The identification images 91b, 92b are supplied to the display 3 via the control unit 2 so as to be displayed. The rest of the components in this embodiment are the same as those in the previous embodiments.

The moving 3D images captured in real time by the at least one camera 7 may also be stored in the memory unit 6 via the control unit 2, and the control unit 2 may be electrically connected to an external computer via a network. Thus, the moving 3D images captured in real time by the at least one camera 7 can be monitored through the external computer.

In still another embodiment, the present invention further includes a sensor 8, 8a (see FIG. 3) electrically connected to the control unit 2.

The sensor 8 may be a doorbell switch provided outside the door to the vestibule in the identification image 91b (see FIG. 11). Meanwhile, the electric appliance 9 may be the electronic lock of an anti-burglary device of the same door. Thus, the space where the sensor 8 is located is different from the space where the electric appliance 9 is located. When a visitor presses the doorbell switch outside the door, the sensor 8 sends out a trigger signal. As soon as the sensor 8 sends out the trigger signal, the control unit 2 compulsorily switches the content displayed by the display 3 to the identification image 91b, thereby allowing the user to know in real time the arrival of the visitor. The user may then switch the switching element 1 to turn off the electronic lock of the anti-burglary device.

Alternatively, the sensor 8a may be an infrared sensor provided inside the door to the vestibule in the identification image 91b, and the electric appliance 9 may be a loudspeaker of an alarm in the vestibule. In that case, the sensor 8a and the electric appliance 9 are located in the same space. Should someone break into the vestibule through the door, the sensor 8a will send out a trigger signal upon sensing the invader's body. When the sensor 8a sends out the trigger signal, the control unit 2 compulsorily switches the content displayed by the display 3 to the identification image 91b, thereby notifying the user in real time to the invasion and allowing the user to turn on the loudspeaker of the alarm by switching the switching element 1.

Thus, the electric appliance 9—be it located in the same space as or in a space different from the sensor 8, 8a—can be turned on or off by the single switching element 1. The rest of the components in this embodiment are the same as those in the previous embodiments.

Compared with the prior art, the present invention has the following advantages:

1. As the single switching element is capable of controlling the electric appliances respectively represented by the plural identification images displayed by the display, the present invention provides multiple power control.

2. The identification image corresponding to a particular electric appliance can be selected through the display, and this particular electric appliance can be mechanically turned on or off with the switching element. Thus, the touch panel used in the switch module is prevented from being improperly pressed, which may otherwise compromise the sensitivity of or even break the touch panel. Consequently, the switch module of the present invention features enhanced durability and a long service life.

3. As the housing of the switching element may be the housing of a traditional wall-mounted switch, the switch module of the present invention can directly replace an existing traditional wall-mounted switch, thereby upgrading the traditional wall-mounted switch to an intelligent one.

4. Once the switching element is switched, whether the intended electric appliance is turned on or off can be monitored in real time through the display. This allows the user to know the operating conditions of the multiple electric appliances, which may be located in different spaces.

5. The light-emitting elements can indicate the locations of the switch module and of the at least one button and also serve as a small night lamp.

6. The display of the switch module can display the current time, temperature, and humidity for easy reference by the user.

7. The identification images, time, temperature, and humidity displayed can be switched by sliding a finger along the touch panel, which is convenient and user-friendly.

What is claimed is:

1. An intelligent wall-mounted switch module, comprising:
    a switching element provided on a wall, the switching element comprising:
        a seat provided in the wall and formed with a receiving cavity which is open on a front side and a back side thereof, and a top of the receiving cavity formed with a plurality of fastening grooves;
        a housing provided on the seat and exposed from the wall;
        a key pivotally provided on the seat and exposed from the housing and having a window in which the display is embedded, the window communicating with the receiving cavity of the seat, and a top of the key being formed with a plurality of hooks which extend toward the seat and are respectively and pivotally connectable to the fastening grooves; and
        a power on/off unit is provided in the housing;
    a control unit provided in and electrically connected to the switching element;
    a plurality of electric appliances each electrically connected to the control unit;
    a display provided on the switching element, electrically connected to the control unit, and configured for displaying, under control of the control unit, a plurality of identification images of the electric appliances or a space or spaces where the electric appliances are located can be identified;
    a touch panel provided on a surface of the display and electrically connected to the control unit, wherein by sliding a human finger along the touch panel, the control unit is capable of being instructed to switch a content displayed by the display to any said Identification image, and wherein when the switching element, which is mechanical, is subsequently switched, the control unit turns on or off the electric appliance corresponding to the identification image displayed by the display, thus allowing the electric appliances to be turned on or off with the single switching element through touch-based selection in a mechanical manner;
    wherein the power on/off unit is electrically connected to the control unit, and the power on/off unit has a resilient rod that is depressible into the power on/off unit by the key so as to drive the control unit to turn on or off the electric appliance.

2. The intelligent wall-mounted switch module of claim 1, wherein a plurality of light-emitting elements are provided inward of a periphery of the housing, and at least one button configured for turning on or off the light-emitting elements is provided on the housing, such that the light-emitting elements can be driven to emit light by the at least one button and thus indicate a location of the switching element, each said button being provided therein with a tight-emitting element for indicating a location of the each said button.

3. The intelligent wall-mounted switch module of claim 1, wherein the electric appliances are located in a same space as the switching element or are located in a space or spaces different from where the switching element is located, such that the single switching element can turn on or off the electric appliances located in the same space as the switching element or in the space or the spaces different from where the switching element is located.

4. The intelligent wall-mounted switch module of claim 1, wherein the electric appliances are domestic electric appliances, alarms, or anti-burglary devices.

5. The intelligent wall-mounted switch module of claim 1, further comprising a memory unit provided in the switching element and electrically connected to the control unit, wherein the memory unit stores the identification images, which are still images, and supplies the identification images through the control unit to the display for display.

6. The intelligent wall-mounted switch module of claim 1, further comprising at least one camera electrically connected to the control unit, wherein the at least one camera is provided in a space or spaces where the electric appliances are located and is configured for capturing the identification images in real time and supplying the identification images through the control unit to the display for display.

7. The intelligent wall-mounted switch module of claim 1, further comprising a sensor electrically connected to the control unit and provided in a same space as the electric appliances or in a space different from where the electric appliances are located, wherein when the sensor sends out a trigger signal, the control unit instructs the display to display a said identification image.

8. The intelligent wall-mounted switch module of claim 7, wherein the sensor is an infrared senor or a doorbell switch.

9. The intelligent wall-mounted switch module of claim 1, wherein the control unit is electrically connected to a temperature detector or a humidity detector so as for the display to display, under control of the control unit, a current time, a temperature detected by the temperature detector, or a humidity detected by the humidity detector, and wherein the identification images, the current time, the temperature, and the humidity can be switched by sliding a human finger along the touch panel.

* * * * *